United States Patent
Glick et al.

(10) Patent No.: US 8,549,626 B1
(45) Date of Patent: Oct. 1, 2013

(54) METHOD AND APPARATUS FOR SECURING A COMPUTER FROM MALICIOUS THREATS THROUGH GENERIC REMEDIATION

(75) Inventors: Adam Lyle Glick, Culver City, CA (US); Spencer Dale Smith, El Segundo, CA (US); Nicholas Robert Graf, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 395 days.

(21) Appl. No.: 12/407,903

(22) Filed: Mar. 20, 2009

(51) Int. Cl.
*G06F 21/00* (2013.01)

(52) U.S. Cl.
USPC .......... 726/22; 726/25; 726/26; 718/100; 709/203

(58) Field of Classification Search
USPC .................................. 726/25, 22
See application file for complete search history.

(56) References Cited

U.S. PATENT DOCUMENTS

| | | | |
|---|---|---|---|
| 7,657,754 B2* | 2/2010 | Chambers et al. | 713/188 |
| 7,770,031 B2* | 8/2010 | MacKay et al. | 713/193 |
| 7,797,733 B1* | 9/2010 | Sallam | 726/4 |
| 7,832,008 B1* | 11/2010 | Kraemer | 726/22 |
| 8,132,260 B1* | 3/2012 | Mayer et al. | 726/25 |
| 8,291,093 B2* | 10/2012 | Choe | 709/229 |
| 2005/0120242 A1* | 6/2005 | Mayer et al. | 713/201 |
| 2006/0010485 A1* | 1/2006 | Gorman | 726/3 |
| 2006/0010497 A1* | 1/2006 | O'Brien et al. | 726/26 |
| 2006/0101517 A1* | 5/2006 | Banzhof et al. | 726/25 |
| 2007/0244877 A1* | 10/2007 | Kempka | 707/5 |
| 2009/0044272 A1* | 2/2009 | Jarrett | 726/23 |

OTHER PUBLICATIONS

Espacenet Search Result, Espacenet result list, Jul. 2011.*
NIST, Creating a Patch and Vulnerability Management Program, Nov. 2005.*

* cited by examiner

*Primary Examiner* — Andy Rao
*Assistant Examiner* — Shan Elahi
(74) *Attorney, Agent, or Firm* — Wilmer Cutler Pickering Hale and Dorr LLP

(57) ABSTRACT

A method and apparatus for securing a computer from malicious threats through generic remediation is described. In one embodiment, the method for securing a computer from malicious threats through generic remediation includes processing at least one malicious threat to the computer, wherein the at least one malicious threat is not associated with a specific remediation technique and examining information regarding prior remediation of the at least one malicious threat by at least one computer to determine at least one remediation technique for the at least one malicious threat.

19 Claims, 3 Drawing Sheets

METHOD AND APPARATUS FOR SECURING A COMPUTER FROM MALICIOUS THREATS THROUGH GENERIC REMEDIATION

BACKGROUND

1. Field of the Invention

Embodiments of the present invention generally relate to computer security systems and, more particularly, to a method and apparatus for securing a computer from complex malicious threats through generic remediation.

2. Description of the Related Art

Due to increasing utilization of data and computer networks, complexity and number of malicious threats to a computer (e.g., malicious software programs such as computer viruses, worms, Trojans, rootkits, malicious drivers and/or the like) are also increasing exponentially. For example, the rootkits are software programs designed by intruders to hide processes, files and activities from an operating system and an authorized user of the computer. Furthermore, the malicious software programs may exert control over an operating system of the computer and modify various parts (e.g., a system registry) and/or install malicious drivers. As a result, the intruders may gain complete access to the computer while avoiding detection and hence, exploit computer resources for illegitimate benefits.

In particular, the malicious software programs may be distributed in a variety of ways, such as downloading and opening infected files (e.g., email), exerting control over computer operations and transmitting the malicious software programs over a network without any direct intervention by a user. Once the malicious software program resides on the computer, a variety of problems may occur, including impairment of the computer resources, intentional destruction or corruption of stored information, causing the computer to shut down and/or crash, misappropriation of personal and/or confidential information and/or the like.

Generally, the malicious threats are distinct from one another. For example, the malicious software programs include different software code and thus, perform different operations. In some instances, one or more malicious software programs may corrupt the stored information; whereas, another malicious software programs may disable and/or exhaust the computer resources. Consequently, the malicious threats may also differ in complexity.

Currently, various security software programs (e.g., anti-virus, anti-spyware, anti-phishing software programs) employ one or more techniques (e.g., running human-generated and tested scripts, rebooting the computer and/or the like) to remediate the complex malicious threats. The one or more remediation techniques may be specific to a particular complex malicious threat. On the other hand, one or more remediation techniques may be generic for most malicious threats (e.g., unknown and/or very complex malicious software programs). For example, the security software program may execute a security scan of the computer to detect the malicious software programs embedded within infected computer files. In addition, the security software programs provide various remedial measures such as, removing the malicious software programs from the infected files, quarantining the infected files, or deleting the infected files from the computer.

Typically, the human-generated and tested script remediation technique depends upon signature-based detection technologies. For example, a cleanup script is generated in accordance with a detected signature of the malicious software program to remediate the complex malicious threat. The cleanup script indicates a list of processes to kill, programs to remove the malicious software programs from the file system, and to delete or restore configuration data to its default values. However, a significant amount of time may be consumed in generating the cleanup script and meanwhile, the malicious software program may be proliferated within the computer as well as other computers over the network. Moreover, the cleanup script may be error prone (e.g., due to errors made during the generation of the cleanup script). In other words, the human-generated cleanup script is not scalable in terms of accuracy and as a result, may fail to remediate the complex malicious threats from the computer.

Alternatively, various other security software programs may utilize generic remediation technique to remediate the complex malicious threats from the computer. Sometimes, the generic remediation technique fails to completely remediate the complex malicious threats from the computer. For example, the generic remediation technique may not be able to remove each and every malicious software program from an infected file and hence, the computer remains infected. Furthermore, such failed generic remediation may make the computer non-bootable and hence, the operating system is required to be re-installed on the computer. As a result, security of the computer may be compromised.

Therefore, there is a need in the art, for a method and apparatus for securing a computer from malicious threats through generic remediation.

SUMMARY OF THE INVENTION

Embodiments of the present invention generally comprise a method and apparatus for securing a computer from malicious threats through generic remediation. In one embodiment, a method for securing a computer from malicious threats through generic remediation includes processing at least one malicious threat to the computer, wherein the at least one malicious threat is not associated with a specific remediation technique and examining information regarding prior remediation of the at least one malicious threat by at least one computer to determine at least one remediation technique for the at least one malicious threat.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
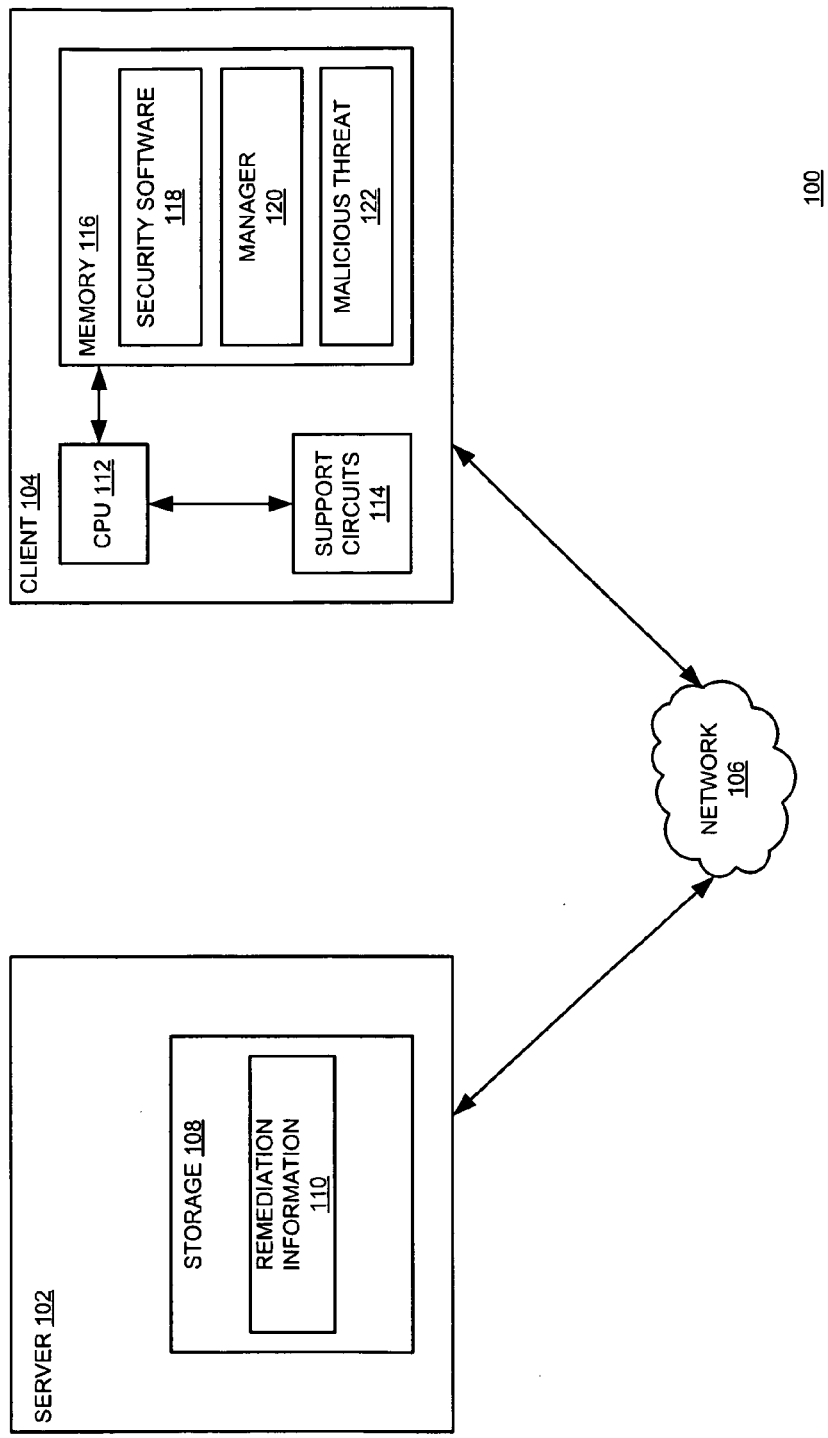
FIG. 1 is a block diagram of a system for securing a computer from malicious threats through generic remediation in accordance with one or more embodiments of the invention.

FIG. 1 is a block diagram of a system 100 for securing a computer from malicious threats through generic remediation according to one or more embodiments of the invention. The system 100 includes a server 102 and a client 104 where both are coupled to each other through a network 106.

The server 102 is a type of computing device (e.g., a laptop, a desktop, a Personal Digital Assistant (PDA), a mobile phone and/or the like), such as those generally known in the art. The server 102 includes storage 108 to facilitate permanent storage of remediation information 110. Generally, the storage 108 includes various components (i.e., hardware and software) that are configured to manage storage resources within a computing environment. The storage 108 generally includes one or more data storage devices (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) to the one or more data storage devices for one or more computing devices, such as the client 104. For example, the remediation information 110 may be organized as a database to which the storage 108 controls access.

The client 104 is a type of computing device (e.g., a laptop, a desktop, a Personal Digital Assistant (PDA), a mobile phone and/or the like), such as those generally known in the art. The client 104 includes a Central Processing Unit (CPU) 112, various support circuits 114 and a memory 116. The CPU 112 may comprise one or more commercially available microprocessors or microcontrollers that facilitate data processing and storage. The various support circuits 114 facilitate the operation of the CPU 112 and include one or more clock circuits, power supplies, cache, input/output circuits and the like. The memory 116 comprises at least one of Read Only Memory (ROM), Random Access Memory (RAM), disk drive storage, optical storage, removable storage and the like. The memory 116 includes various software packages, such as security software 118, a manager 120 and a malicious threat 122.

Generally, the network 106 comprises a communication system that connects computers by wire, cable, fiber optic and/or wireless link facilitated by various types of well-known network elements, such as hubs, switches, routers and the like. The network 106 may employ various well-known protocols to communicate information amongst the network resources. For example, the network 106 may be a part of the Internet or intranet using various communications infrastructure, such as Ethernet, Wi-Fi, WiMax, General Packet Radio Service (GPRS) and the like.

Generally, the malicious threat 122 includes one or more software programs that may be configured to disrupt operations and/or cause damage at a computer, such as the client 104. For example, the malicious threat 122 may be a rootkit, a backdoor, a worm, a virus, Trojan horse and/or the like. Alternatively, the malicious threat 122 (e.g., adware, bots and/or the like) may simply collect data or present ads instead of disrupting operations or causing any damage. Furthermore, the malicious threat 122 may be transmitted (e.g., downloaded) to the client 104 through an application (e.g., a browser, a media player, e-mail software and/or the like) in a form of an e-mail attachment, media data, an executable, a pop-up advertisement and/or the like. For example, a user may be browsing a malicious website that surreptitiously installs the malicious threat 122 when the user clicks on a pop-up advertisement. Subsequently, the malicious threat 122 exploits one or more operating system vulnerabilities to attain partial or complete control over the client 104 without user authorization and/or knowledge. Once the malicious threat 122 exerts control over the client 104, the malicious threat 122 may delete or corrupt applications or computer data files as well as compromise sensitive information, such as personal data or online credentials (e.g., passwords, security question answers, social security numbers, credit card numbers and/or the like).

According to various embodiments, the remediation information 110 includes one or more remediation techniques utilized by one or more computers (e.g., similar to the client 104) for various malicious threats (e.g., the malicious threat 122). In one embodiment, the remediation information 110 indicates previous attempts by the one or more computers to apply one or more generic remediation techniques to the one or more malicious threats. In one embodiment, the one or more generic remediation techniques may include rebooting a computer, deleting a malicious driver and/or executing a security scan of file data to remove the one or more malicious threats from the one or more clients. For example, the remediation information 110 may indicate that a computer executed a security scan in an attempt to remediate the malicious threat 122 on a prior occasion.

In one embodiment, the remediation information 110 pertains to prior remediation of the various malicious threats by the one or more clients. For example, the remediation information 110 may indicate a successful remediation of a particular virus by another client. Further, the successful remediation indicates that the one or more generic remediation techniques have successfully remediated the one or more malicious threats. For example, the SYMANTEC Norton AntiVirus successfully remediates a Trojan horse (e.g., Hacktool.rootkit) from a computer and the information regarding this successful remediation may be stored in the remediation information 110. In other embodiment, the remediation information 110 includes information regarding unsuccessful remediation of the one or more malicious threats by the one or more computers. Further, the unsuccessful remediation indicates that the one or more generic remediation techniques have not successfully remediated the one or more malicious threats. In other words, the generic remediation techniques have failed to remediate the malicious threats.

Generally, the security software 118 includes various software-based technologies that safeguard computers against numerous malicious threats. The various software-based protection technologies (e.g., anti-virus, anti-spyware, email scanning, anti-phishing, firewall, web-site authentication, anti-rootkit and/or identity protection technologies) that detect the malicious threats 122 and mitigates any damage. For example, SYMANTEC Norton AntiVirus is configured to detect and remediate to the malicious threats in order to protect the computer (e.g. the client 104).

According to various embodiments, the security software 118 is configured to detect the malicious threat 122 on the client 104. In one embodiment, the security software 118 may utilize various detection techniques (e.g., behavior blocking, machine learning and/or heuristics) to identify various malicious threats to the client 104. For example, SYMANTEC Norton AntiBot uses active behavioral-based analysis to provide real-time protection against web robot (i.e., bot) attacks where a computer is hijacked and/or sensitive data is compromised.

The manager 120 includes software code that is configured to process one or more malicious threats to the client 104, such as the malicious threat 122. In one embodiment, the manager 120 generates a query that identifies the malicious threat 122. In one embodiment, the manager 120 generates the query after the security software 118 detects the malicious threat 122. The query may include information regarding the malicious threat 122. For example, the query may include a full path, a hash (e.g., hash values of critical portion of an infected file (e.g., normal Antivirus engine hash areas, common critical functions, such as DriverEntry)), version information, a unique machine GUID (Global Unique Identifier) and/or the like. Subsequently, the manager 120 communicates the query regarding the malicious threat 122 to the server 102.

According to various embodiments, the manager 120 accesses the remediation information 110 and compares the query with information regarding prior remediation of the malicious threat 122 by one or more computers. Such a comparison determines one or more techniques for remediating the malicious threat 122. After accessing the information regarding prior remediation of the malicious threat 122 by the one or more clients, the server 102 identifies whether the prior remediation of the malicious threat 122 is successful or not.

For example, the manager 120 examines the remediation information 110 and identifies a successful prior remediation of the malicious threat 122. As another example, the manager 120 identifies an unsuccessful prior remediation of the malicious threat 122. As yet another example, the manager 120 identifies a lack of prior remediation of the malicious threat. The manager 120 determines that the malicious threat 122 is encountered for a first time because no computer previously attempted to remediate of the malicious threat 122 using one or more generic remediation techniques.

According to various embodiments, the manager 120 includes software code that is configured to examine the information regarding prior remediation of the malicious threat 122 and determine a remediation technique that is to be applied to the malicious threat 122. Furthermore, the malicious threat 122 may not be associated with a specific remediation technique. In one embodiment, the manager 120 identifies one or more generic remediation techniques that one or more computers previously utilized to successfully remediate the malicious threat 122. As such, the manager 120 instructs the security software 118 to apply the one or more generic remediation techniques to the malicious threat 122.

In another embodiment, the manager 120 identifies one or more unsuccessful generic remediation techniques the one or more computers previously utilized. Accordingly, the manager 120 prevents the security software 118 from applying the one or more unsuccessful generic remediation techniques. For example, SYMANTEC provides an application (e.g., FixRyknos.exe) that successfully removes a rootkit (e.g., SecurityRisk.First4DRM). Based on the information regarding prior remediation of the rootkit by one or more computers, the manager 120 either executes the application if another computer successfully removed the rootkit using the application or blocks execution if another computer experienced problems.

In yet another embodiment, the information regarding prior remediation indicates that no computer previously applied a remediation technique to the malicious threat 122. In other words, the malicious threat 122 may be unknown and/or not associated with any remediation technique. Because no remediation technique was ever applied, the manager 120 utilizes generic remediation for the malicious threat 122. Hence, the manager 120 instructs the security software 118 to remediate the malicious threat 122 in accordance with any generic remediation technique, as described above.

According to various embodiments, the security software 118 and the manager 120 cooperate to remediate malicious threats to the client 104. In one embodiment, the security software 118 applies one or more techniques that are determined by the manager 120 for remediating the malicious threat 122. The security software 118 utilizes the one or more generic remediation techniques to remediate the malicious threat 122. Further, the security software 118 processes instructions regarding the generic remediation techniques from the manager 120. In one embodiment, the security software 118 reboots the client 104 to remediate the malicious threat 122. In another embodiment, the security software 118 deletes a driver associated with the malicious threat 122. For example, the security software 118 removes a malicious driver from a computer (e.g. the client 104) and then, forces a reboot. In yet another embodiment, the security software 118 executes a security scan of file data to remove the malicious threat 122.

According to various embodiments, the manager 120 sends a message to the server 102 regarding generic remediation of the malicious threat 122. In one embodiment, the manager 120 sends a "Safely Remediated" message to the server 102 after the security software 118 successfully remediates the malicious threat 122 from the client 104 using generic remediate. In other words, the "Safely Remediated" message indicates that one or more generic remediation techniques successfully remediated the malicious threat 122. In another embodiment, the manager 120 sends a "Not Safely remediated" message to the server 102 if the malicious threat 122 is not successfully remediated from the client 104 using generic remediation. Basically, the "Not Safely Remediated" message indicates that one or more generic remediation techniques are unsuccessful with respect to the malicious threat 122. For example, the manager 120 sends the "Not Safely remediated" message to the sever 102 if the security software 118 re-detects the malicious threat 122 after rebooting the client 104.

Occasionally, the manager 120 may not be able to send any message to the server 102. For example, the client 104 may not be able to restart after rebooting. In such instances, the server 102 determines that the malicious threat 122 is not successfully remediated after waiting a pre-determined time period. In other words, the server 102 determines that the generic remediation of the malicious threat 112 is unsuccessful. In one embodiment, the server 102 updates the remediation information 110 regarding the successful or unsuccessful generic remediation of the malicious threat 122. Furthermore, if the generic remediation is unsuccessful, then the malicious threat 122 is most likely complex and requires additional security analysis to successfully remediate the malicious threat 122.

Figure 2:
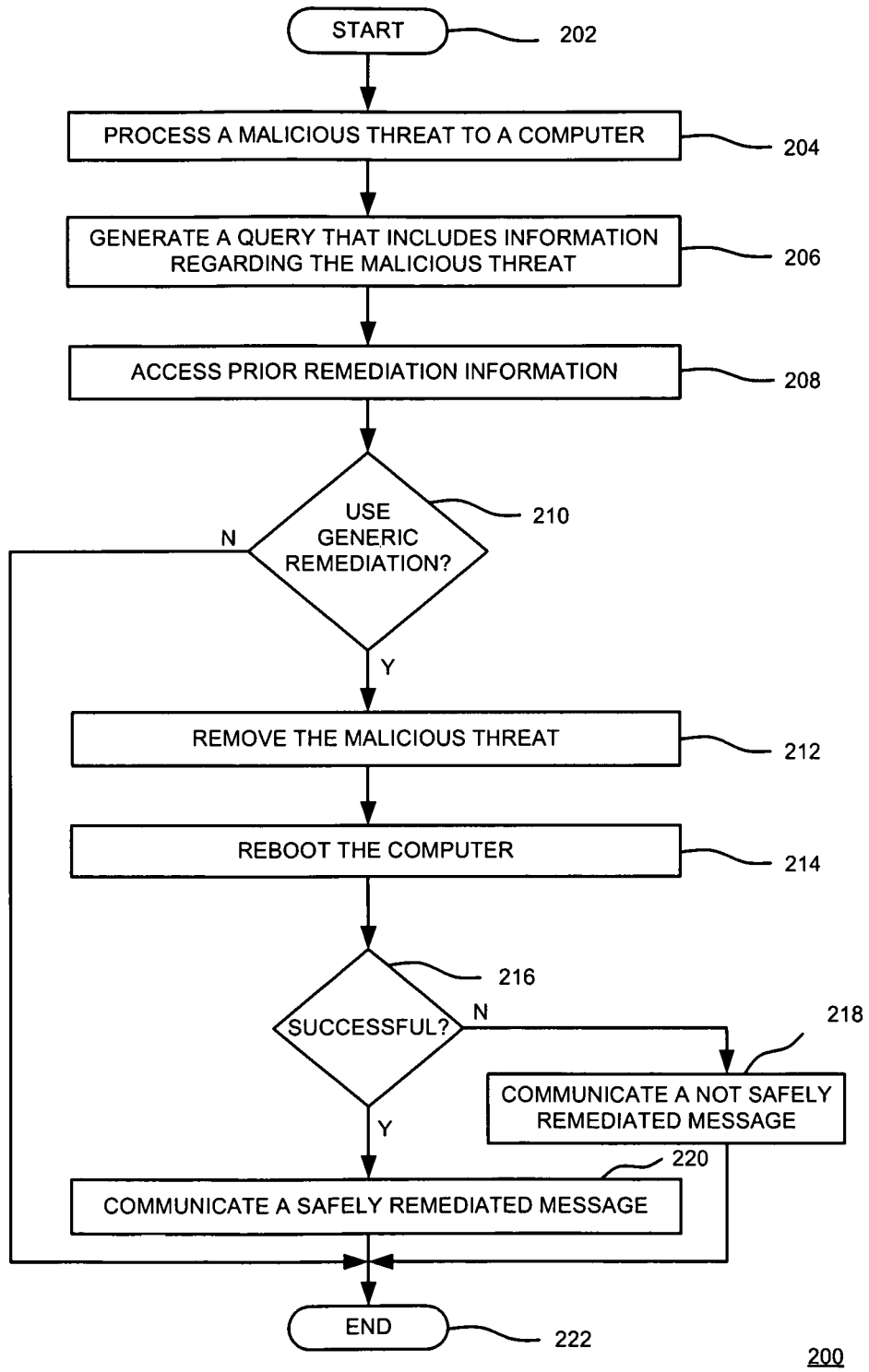
FIG. 2 is a flow diagram of a method for securing a computer from malicious threats through generic remediation in accordance with one or more embodiments of the invention.

FIG. 2 is a flow diagram of a method 200 for securing a computer from malicious threats through generic remediation according to one or more embodiments of the invention. The method 200 starts at step 202 and proceeds to step 204, at which a malicious threat (e.g., the malicious threat 122 of FIG. 1) to a computer (e.g., the client 104 of FIG. 1) is processed. In one embodiment, a manager (e.g., the manager 120 of FIG. 1) processes the malicious threat to the computer.

At step 206, a query that includes information regarding the malicious threat is generated. At step 208, the remediation information is accessed. Such information identifies the malicious threat and is compared with remediation information (e.g., the remediation information 110 of FIG. 1) to assess prior remediation of the malicious threat. In one embodiment, the server accesses the prior remediation information to identify whether prior remediation of the malicious threat that is attempted by one or more computers is successful or unsuccessful. In other embodiment, the server notifies the manager whether a generic remediation technique utilized by one or more computers is successful or unsuccessful. Further, the manager examines the prior remediation information and determines whether to use the generic remediation technique to remediate the malicious threat.

At step 210, a determination is made as to whether to use generic remediation for the malicious threat. In one embodiment, the remediation information indicates a successful prior remediation of the malicious threat using a generic remediation technique, such as deleting a driver associated with the malicious threat. If at the step 210, it is determined that the generic remediation is not to be used (option "NO"), then the method 200 proceeds to step 222. For example, the manager does not instruct security software (e.g., the security software 118 of FIG. 1) to execute a security scan of computer data since the remediation information indicates such a generic remediation technique to be unsuccessful as confirmed by another computer that experienced problems. If, at the step 210, it is determined that the generic remediation is to be used (option "YES"), then the method 200 proceeds to step 212. At the step 212, the malicious threat is removed. For example, the security software removes the malicious threat from the computer by performing the security scan on the computer data. At step 214, the computer is rebooted. For example, the security software restarts the computer after the generic remediation technique is performed.

At step 216, a determination is made as to whether the generic remediation is successful. For example, the manager determines whether the malicious threat is successfully remediated using a generic remediation technique. If at the step 216, it is determined that the generic remediation is not successful (option "NO"), then the method 200 proceeds to step 218. At the step 218, a "Not Safely Remediated" message is communicated. For example, if the security software detects the malicious threat after rebooting the computer, then the manager sends a message indicating that the generic remediation technique did not successfully remediate the malicious threat.

In other embodiment, the computer may not be able to reboot after the generic remediation. In such instances, the server waits for a pre-determined time period. If no message arrives at the server during that time period, then the generic remediation technique is most likely unsuccessful. Further, the server stores information regarding generic remediation results as the remediation information in order to warn other computers not to use the generic remediation technique on a particular malicious threat. After step 218, the method 200 proceeds to step 222. If at step 216, it is determined that the generic remediation is successful (option "YES"), then the method 200 proceeds to step 220. At step 220, a "Safely Remediated" message is communicated. At step 222, the method 200 ends.

Figure 3:
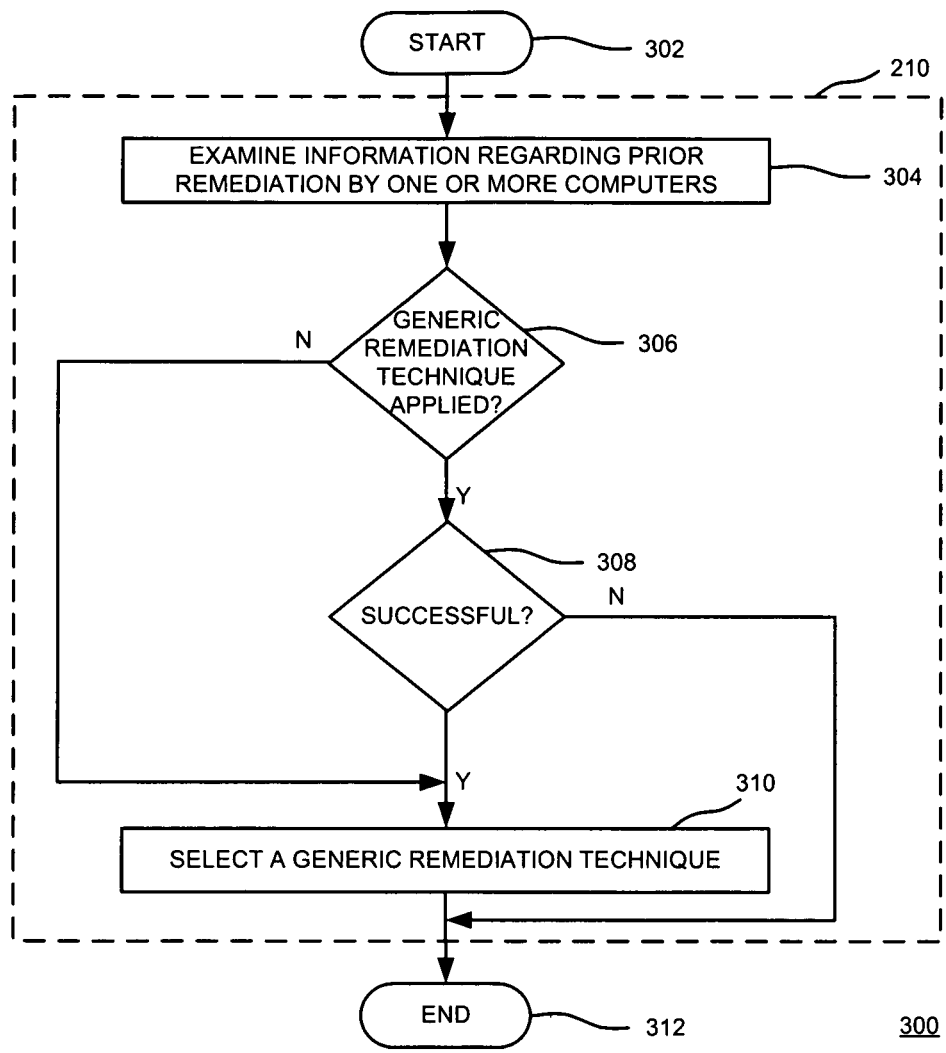
FIG. 3 is a flow diagram of a method for selecting a generic remediation technique to secure a computer from malicious threats in accordance with one or more embodiments of the invention.

FIG. 3 is a flow diagram of a method 300 for selecting a generic remediation technique according to one or more embodiments of the invention. In one embodiment of the invention, the method 300 provides the functionality of the step 210 of the method 200. The method 300 starts at step 302 and proceeds to step 304, at which information regarding prior malicious threat remediation by one or more computers is examined.

At step 306, a determination is made as to whether a generic remediation technique was previously applied to the particular malicious threat. If, at the step 306, it is determined that no computer applied a generic remediation technique to the particular malicious threat (option "NO"), then the method 300 proceeds to step 310. If, at the step 306, it is determined that one or more computers applied one or more generic remediation techniques to the malicious threat (option "YES"), then the method 300 proceeds to step 308.

At the step 308, a determination is made as to whether the generic remediation technique succeeded. If, at the step 308, it is determined that the generic remediation technique did not succeed (option "NO"), then the method 300 proceeds to step 312. If, at the step 308, it is determined that the generic remediation technique succeeded, then the method 300 proceeds to step 310. At the step 310, the generic remediation technique is selected for remediating the particular malicious threat. After step 310, the method 300 proceeds to step 312, at which the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for securing a computer from malicious threats through generic remediation, comprising:
processing, using at least one computer processor, at least one malicious threat to the computer, wherein the at least one malicious threat is not associated with a specific remediation technique;
examining information regarding prior remediation of the at least one malicious threat by at least one computer, wherein the information regarding prior remediation comprises remediation information that indicates remediation techniques used by a plurality of computers for a plurality of malicious threats and a success level of the plurality of computers that previously applied at least one generic remediation technique for the plurality of malicious threats;
determining at least one generic remediation technique for the at least one malicious threat based at least in part on the information regarding prior remediation;
applying the at least one generic remediation technique; and
updating the information regarding prior remediation based at least in part on the at least one applied generic remediation technique.

2. The method of claim 1, wherein the at least one generic remediation technique comprises rebooting the computer.

3. The method of claim 1, wherein the at least one generic remediation technique comprises deleting at least one driver associated with the at least one malicious threat.

4. The method of claim 1, wherein the at least one generic remediation technique comprises executing a security scan of file data to remove the at least one malicious threat.

5. The method of claim 1, wherein processing the at least one malicious threat further comprises communicating a query that identifies the at least one malicious threat.

6. The method of claim 5, wherein the query is compared with remediation information to access the information regarding prior remediation of the at least one malicious threat by the at least one computer.

7. The method of claim 1 further comprising applying at least one generic remediation technique to the at least one malicious threat to produce an application result.

8. The method of claim 7 further comprising communicating the application result to update remediation information regarding remediation techniques used by a plurality of computers for a plurality of malicious threats.

9. The method of claim 1, wherein the information regarding prior remediation of the at least one malicious threat by the at least one computer indicates that a plurality of computers have not attempted to remediate the at least one malicious threat, wherein the at least one malicious threat are unknown.

10. The method of claim 1, wherein the information regarding prior remediation of the at least one malicious threat by the at least one computer indicates at least one successful remediation of the at least one malicious threat using at least one generic remediation technique.

11. The method of claim 1, wherein the information regarding prior remediation of the at least one malicious threat by the at least one computer indicates at least one unsuccessful remediation of the at least one malicious threat using at least one generic remediation technique.

12. An apparatus for securing a computer from malicious threats through generic remediation, comprising:
at least one computer processor communicatively coupled to memory, wherein the at least one computer processor is configured to:
execute a manager configured to process at least one malicious threat to the computer, wherein the at least one malicious threat is not associated with a specific remediation technique;
examine information regarding prior remediation of the at least one malicious threat by at least one computer, wherein the information regarding the prior remediation comprises remediation information that indicates remediation techniques used by a plurality of computers for a plurality of malicious threats and a success level of the plurality of computers that previously applied at least one generic remediation technique for the plurality of malicious threats; and
determine at least one generic remediation technique for the at least one malicious threat based at least in part on the information regarding prior remediation;
applying the at least one generic remediation technique; and
updating the information regarding prior remediation based at least in part on the at least one applied generic remediation technique.

13. The apparatus of claim 12 further comprising security software for removing at least one driver associated with the at least one malicious threat from the computer in accordance with the at least one generic remediation technique.

14. The apparatus of claim 12, wherein the at least one generic remediation technique comprises at least one of rebooting the computer, deleting at least one driver associated with the at least one malicious threat or executing a security scan of file data to remove the at least one malicious threat.

15. The apparatus of claim 12, wherein processing the at least one malicious threat further comprises communicating a query that identifies the at least one malicious threat, wherein the query is compared with remediation information to access the information regarding prior remediation of the at least one malicious threat by the at least one computer.

16. A system for securing a computer from malicious threats through generic remediation, comprising:
a client comprising:
a manager for communicating a query that identifies at least one malicious threat not associated with a specific remediation technique, the manager configured to:
examine information regarding prior remediation of the at least one malicious threat by at least one computer, wherein the information regarding the prior remediation comprises remediation information that indicates remediation techniques used by a plurality of computers for a plurality of malicious threats and a success level of the plurality of computers that previously applied at least one generic remediation technique for the plurality of malicious threats,
determine at least one generic remediation technique for the at least one malicious threat based at least in part on the information regarding prior remediation, wherein information regarding prior remediation indicates a success level of the plurality of computers previously applied at least one generic remediation technique for the plurality of malicious threats,
applying the at least one generic remediation technique, and
updating the information regarding prior remediation as needed based at least in part on the at least one applied generic remediation technique; and
a server, coupled to the client, comprising:
storage comprising the remediation information regarding remediation techniques used by a plurality of computers for a plurality of malicious threats, wherein the query is compared with remediation information to access the information regarding prior remediation of the at least one malicious threat by the at least one computer.

17. The system of claim 16, wherein the remediation information is generated from application of the remediation techniques on the plurality of malicious threats by the plurality of computers.

18. The system of claim 16, wherein the manager instructs security software to apply the at least one generic remediation technique to the at least one malicious threat to produce an application result, wherein the at least one generic remediation technique comprises at least one of rebooting the computer, deleting at least one driver associated with the at least one malicious threat or executing a security scan of file data to remove the at least one malicious threat.

19. The system of claim 18, wherein the manager communicates the application result to update the remediation information.

* * * * *